(12) United States Patent
Xu et al.

(10) Patent No.: US 9,384,554 B2
(45) Date of Patent: *Jul. 5, 2016

(54) CONTEMPORANEOUSLY RECONSTRUCTING IMAGES CAPTURED OF A SCENE ILLUMINATED WITH UNSTRUCTURED AND STRUCTURED ILLUMINATION SOURCES

(71) Applicant: Xerox Corporation, Norwalk, CT (US)

(72) Inventors: Beilei Xu, Penfield, NY (US); Lalit Keshav Mestha, Fairport, NY (US); Edgar A. Bernal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/858,564

(22) Filed: Sep. 18, 2015

(65) Prior Publication Data

US 2016/0012602 A1    Jan. 14, 2016

Related U.S. Application Data

(63) Continuation of application No. 13/533,678, filed on Jun. 26, 2012, now Pat. No. 9,141,868.

(51) Int. Cl.
   *G06K 9/00*   (2006.01)
   *G06T 7/00*   (2006.01)
   *G06K 9/36*   (2006.01)
   (Continued)

(52) U.S. Cl.
   CPC .............. *G06T 7/0075* (2013.01); *G01B 11/25* (2013.01); *G06K 9/36* (2013.01); *G06K 9/46* (2013.01); *G06T 7/0057* (2013.01); *G06T 7/0065* (2013.01); *G06T 2207/10012* (2013.01);
   (Continued)

(58) Field of Classification Search
   None
   See application file for complete search history.

(56) References Cited

U.S. PATENT DOCUMENTS 5,671,343 A    9/1997    Kondo et al.
6,751,344 B1   6/2004    Grumbine
(Continued)

OTHER PUBLICATIONS

Jean-Francois Cardoso, "Blind signal separation: statistical principles", pp. 1-16, (Official Version published as: Proceedings of the IEEE, vol. 9, No. 10, pp. 2009-2025, Oct. 1998).

(Continued)

*Primary Examiner* — Sumati Lefkowitz
*Assistant Examiner* — Carol Wang
(74) *Attorney, Agent, or Firm* — Philip E. Blair; Fleit Gibbons Gutman Bongini & Bianco P.L.

(57) ABSTRACT

What is disclosed is system and method for contemporaneously reconstructing images of a scene illuminated with unstructured and structured illumination sources. In one embodiment, the system comprises capturing a first 2D image containing energy reflected from a scene being illuminated by a structured illumination source and a second 2D image containing energy reflected from the scene being illuminated by an unstructured illumination source. A controller effectuates a manipulation of the structured and unstructured illumination sources during capture of the video. A processor is configured to execute machine readable program instructions enabling the controller to manipulate the illumination sources, and for effectuating the contemporaneous reconstruction of a 2D intensity map of the scene using the second 2D image and of a 3D surface map of the scene using the first 2D image. The reconstruction is effectuated by manipulating the illumination sources.

18 Claims, 8 Drawing Sheets

(51) Int. Cl.
*G01B 11/25* (2006.01)
*G06K 9/46* (2006.01)

(52) U.S. Cl.
CPC ............... *G06T 2207/20104* (2013.01); *G06T 2207/30076* (2013.01)

(56) References Cited

U.S. PATENT DOCUMENTS

| | | |
|---|---|---|
| 7,227,977 B1 | 6/2007 | Dotsenko |
| 7,492,927 B2 | 2/2009 | Marschner et al. |
| 8,600,213 B2 | 12/2013 | Mestha et al. |
| 9,007,438 B2 | 4/2015 | Mestha et al. |
| 2002/0140670 A1 | 10/2002 | Albeck et al. |
| 2002/0140821 A1 | 10/2002 | Segev et al. |
| 2005/0007487 A1 | 1/2005 | Miyoshi et al. |
| 2006/0268153 A1 | 11/2006 | Rice et al. |
| 2013/0215244 A1 | 8/2013 | Mestha et al. |
| 2013/0235178 A1 | 9/2013 | Wang et al. |
| 2013/0342756 A1 | 12/2013 | Xu et al. |

OTHER PUBLICATIONS

Hyvarinen, et al., "Independent Component Analysis: Algorithms and Applications", Neural Networks Research Centre, Helsinki University of Technology, Finland, Neutral Networks, pp. 1-31, 13(4-5); 411-430, 2000.

Jason Geng, "Structured-Light 3D Surface Imaging: A Tutorial", Advances in Optics and Photonics vol. 3, pp. 128-160, Optical Society of America, Mar. 31, 2011.

CONTEMPORANEOUSLY RECONSTRUCTING IMAGES CAPTURED OF A SCENE ILLUMINATED WITH UNSTRUCTURED AND STRUCTURED ILLUMINATION SOURCES

CROSS REFERENCE TO RELATED APPLICATIONS

The present patent application is a Continuation of U.S. patent application Ser. No. 13/533,678 entitled: "Contemporaneously Reconstructing Images Captured Of A Scene Illuminated With Unstructured And Structured Illumination Sources" by Beilei Xu et al., (allowed Jun. 12, 2015), which is commonly owned and assigned to the Xerox Corporation of Norwalk, Conn., USA.

TECHNICAL FIELD

The present invention is directed to systems and methods for reconstructing images captured of a scene being illuminated with unstructured and structured illumination sources.

BACKGROUND

Simultaneous capture of 3D surface and 2D intensity information of a scene can provide valuable information in many applications. For example, a biometric system may rely on the computation of traditional biometrics to achieve identity verification from 2D intensity images via iris and retina recognition while simultaneously performing 3D face recognition. In another example, a video-based traffic enforcement system may achieve automatic license plate recognition (ALPR) from 2D intensity images and vehicle classification or speed estimation from 3D surface data. In healthcare applications, monitoring cardiac and respiratory events is of clinical importance in the early detection of potentially fatal conditions. Current technologies involve contact sensors the individual must wear constantly. Such a requirement can lead to patient discomfort, dependency, loss of dignity, and further may fail due to a variety of reasons including refusal to wear the monitoring device. Elderly patients are even more likely to suffer from the adverse effects of continued monitoring. Unobtrusive, non-contact, imaging based methods are increasingly needed for monitoring patients. One such system uses a single channel camera under structured and unstructured illuminations to capture video of a subject of interest such that the system can monitor both the cardiac and respiratory events. The system isolates pixels associated with the subject's vascular pathways within each frame from the image frames comprising pixels with intensity values corresponding to detected reflected energy projected by unstructured illumination source and estimates subject's chest volume by reconstructing 3D depth map from the image frames comprising pixels corresponding to detected reflected energy projected by structured illumination source. This system requires the simultaneous projection of structured and unstructured light sources. However, artifacts due to the interference caused by the use of structured light patterns have arisen. Such artifacts can adversely impact on the 3D surface reconstruction and spatial feature extraction. For example, FIG. 1 shows an image of a random structured light pattern projected onto a subject's hand. Pixels from the projected dot pattern of the structured illumination source can alter the extracted underlying vascular patterns even when interpolated with values of surrounding pixels, especially when the blood vessels therein are narrow or short and the projected dot pattern has a relatively high density. This can negatively impact cardiac/respiratory data derived from information associated with pixels of the subject's blood vessels.

Accordingly, what is needed in this art are increasingly sophisticated methods for reconstructing images captured of a scene being illuminated with unstructured and structured illumination sources.

INCORPORATED REFERENCES

The following U.S. patents, U.S. patent applications, and Publications are incorporated herein in their entirety by reference.

"3D Imaging Using Structured Light For Accurate Vehicle Occupancy Determination", U.S. patent application Ser. No. 13/476,334, by Mestha et al.

"Processing A Video For Vascular Pattern Detection And Cardiac Function Analysis", U.S. patent application Ser. No. 13/483,992, by Mestha et al.

"Filtering Source Video Data Via Independent Component Selection", U.S. patent application Ser. No. 13/281,975, by Mestha et al.

"Removing Environment Factors From Signals Generated From Video Images Captured For Biomedical Measurements", U.S. patent application Ser. No. 13/401,207, by Mestha et al.

"Blind Signal Separation: Statistical Principles", Jean-Francois Cardoso, Proceedings of the IEEE, Vol. 9, No. 10, pp. 2009-2025, (October 1998).

"Independent Component Analysis: Algorithms And Applications", Aapo Hyvärinen and Erkki Oja, Neural Networks, 13(4-5), pp. 411-430, (2000).

"Structured-Light 3D Surface Imaging: A Tutorial", by Jason Geng, Advances in Optics and Photonics Vol. 3, pp. 128-160, (Mar. 31, 2011) Optical Society of America.

BRIEF SUMMARY

What is disclosed is a system and method for contemporaneously reconstructing images captured of a scene being illuminated with unstructured and structured illumination sources. In one embodiment, the system comprises a video capture device for capturing video of a scene being actively illuminated by both a structured and unstructured illumination source. A controller effectuates a manipulation of the illumination sources during capture of the video. A processor is configured to execute machine readable program instructions enabling the controller to manipulate the illumination sources and captures at least one 2D image containing energy reflected from a scene being illuminated by a structured illumination source projecting patterns of light onto said scene and at least one 2D image containing energy reflected from the scene being illuminated by an unstructured illumination source for effectuating the contemporaneous reconstruction of a 2D intensity map of the scene using the second 2D image and of a 3D surface map of the scene using the first 2D image. Note that these two images can be extracted from a single acquired image. The reconstruction is effectuated by manipulating the illumination sources. The contemporaneous reconstruction is effectuated by having manipulated the illumination sources during capture of the first and second 2D images, as disclosed herein in greater detail.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
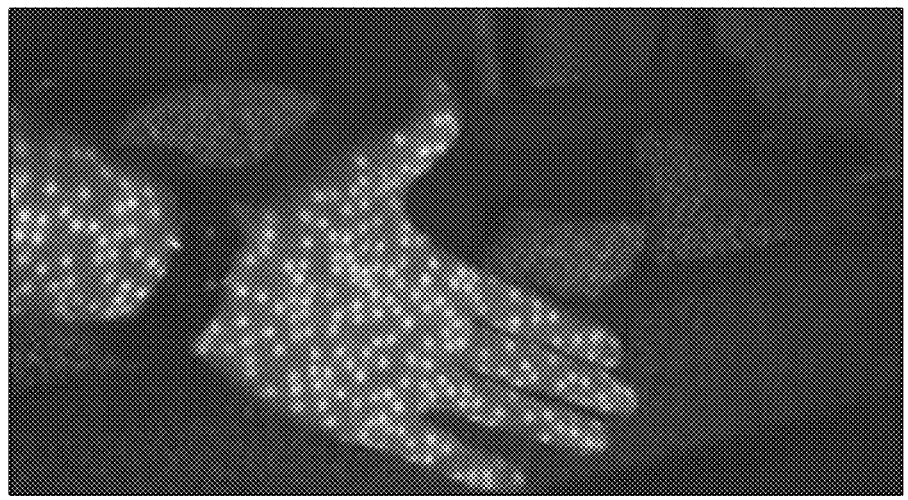
FIG. 1 shows an image of a projected random structured light pattern onto a subject's hand.

What is disclosed is a system and method for contemporaneously reconstructing images captured of a scene being illuminated with unstructured and structured illumination sources.

Non-Limiting Definitions

A "region of interest" refers to one or more regions or areas of a subject of interest being video-taped using a video capture device. What defines a region of interest will largely depend on the application wherein the teachings hereof find their intended uses. For example, if the video is being captured of a subject to facilitate a determination of cardiac function then the region of interest would be an area of the subject's exposed skin such as, for instance, an arm, chest, neck, etc. A region of interest may be the entire image.

A "video capture device" is a device for acquiring a video. In one embodiment, the video capture device is a single channel device operating in a wavelength of interest such as visible or near infrared. In another embodiment, a multi-channel device operating in overlapping wavelength bands with respect to the light sources being captured.

A "video", as is generally understood, is a plurality of 2D image frames captured over time. The video may also contain other components such as, audio, time reference signals, and the like.

"Unstructured illumination" refers to ambient light or an external light source such as a light bulb.

"Structured illumination" is an illumination source which projects light through a patterned grid or window.

"Manipulating the illumination sources", as used herein, refers to spatially temporally, and/or spectrally varying the structured and unstructured illumination sources during capture of the video by the video capture device. In one embodiment where the unstructured illumination source is an ambient light source, the manipulating comprises any of: sequentially alternating a projection of the structured illumination source onto the scene during video capture; selectively choosing a region of interest in the scene, the region being illuminated by the structured illumination source and by ambient light, while the rest of the scene is being illuminated by ambient light alone; and spectrally multiplexing the structured illumination source by making its wavelength range narrower than the wavelength range of ambient light such that reflected energy from both sources can be recovered via filtering. In the embodiment where the unstructured illumination source is not an ambient light source, the manipulating comprises any of: sequentially alternating a projection of the structured and unstructured illumination sources such that neither of the sources is projecting light concurrently; selectively choosing a first and second region of interest in the scene, the first region being illuminated by the structured illumination source and the second region being illuminated by the unstructured illumination source, such that neither of the sources is concurrently projecting light onto a same region; and spectrally multiplexing the illumination sources by making the wavelength range of a first of the illumination sources narrower than a wavelength range of a second of the illumination sources such that reflected energy from both sources can be recovered via filtering. An illumination source can be varied spatially by, for instance, a device controller moving that illumination source such that the source light is projected onto certain regions in the scene from different angles. An illumination source can be varied temporally by, for instance, a device controller toggling the projection of the source light on/off according to a schedule or a desired periodicity. A controller can be configured to vary the intensity of the source light that an illumination source projects.

A "2D intensity pixel map" is a map of a region of interest composed of pixel intensity values obtained by the sensor of the video capture device. In one embodiment, the 2D intensity pixel map is a map of the subject's vascular pattern containing blood vessels which transport hemoglobin.

Triangulation-based 3D Image Reconstruction

Figure 2:
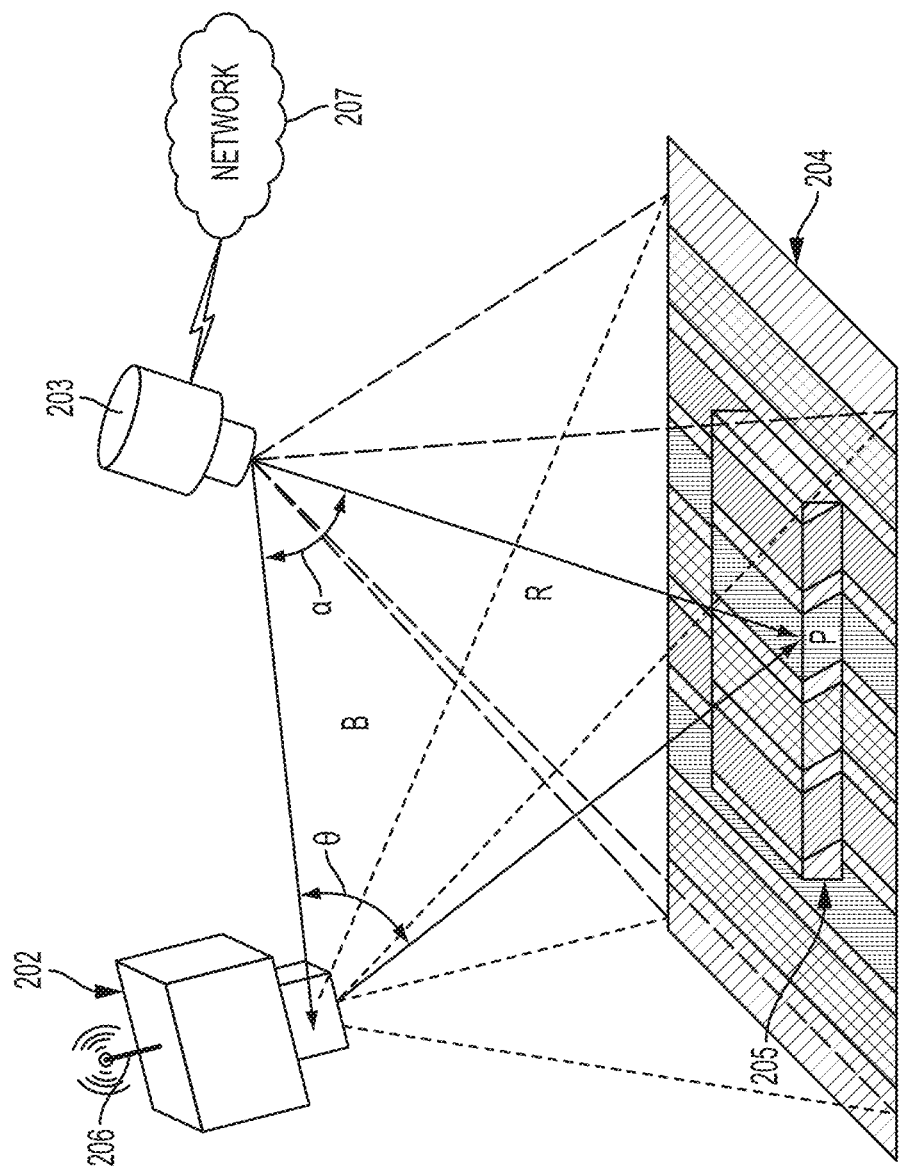
FIG. 2 shows a networked structured illumination source and a video camera for capturing a 2D image of scene containing 3D object.

A "depth map" is a map containing depth values based upon an analysis of the amount of distortion of a structured light pattern reflected from surfaces in that region of the image. Once the depth map has been generated, a volume can be calculated. In FIG. 2, networked structured illumination source 203 projects sinusoidal gratings 204 onto 3D object 205 and the reflection of the impinging sinusoidal gratings is captured by camera system 202 as they reflect off the object. The sinusoidal gratings have known spatial characteristics of undistorted projected patterns. Camera system 202 is shown having a communication element 206 for bi-directional communication with a remote device, such as a workstation (not shown) wherein the captured video is processed in accordance with the teachings hereof. If the scene is a planar surface without any 3D surface variation and oriented approximately parallel to the camera sensor, the pattern shown in the acquired image will be similar to that of the projected structured-light pattern. However, when the surface is non-planar, is not parallel to the camera sensor or contains a 3D object, the shape of the object distorts the projected structured light pattern. Such light distortions can be detected by the video camera. The geometric relationship between camera 202, structured illumination source 203, and point P on the surface of 3D object 205 can be expressed in terms of a triangulation as follows:

$$R = B \frac{\sin(\theta)}{\sin(\alpha + \theta)} \quad (1)$$

Figure 3:
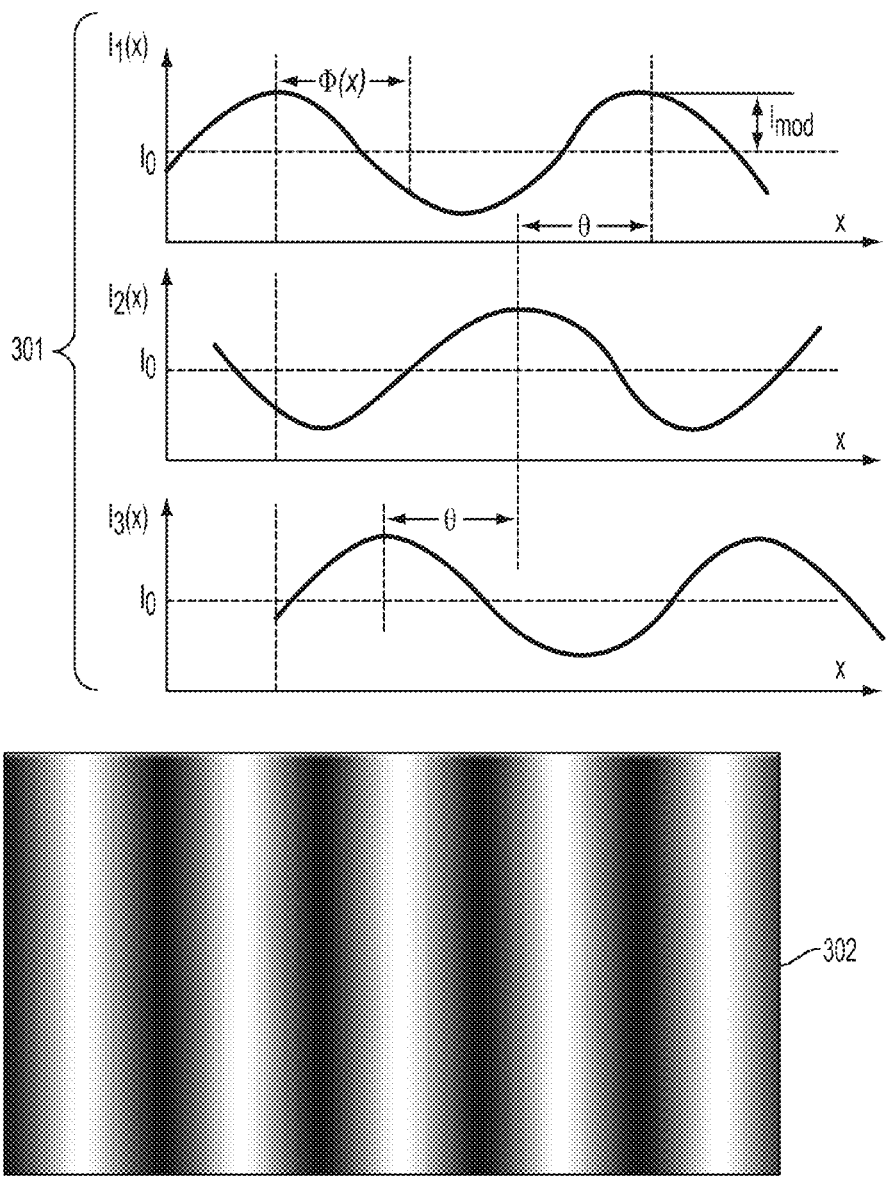
FIG. 3 shows the phase shift with three projection patterns and an example fringe image.

Accurate 3D image reconstruction can be based on a phase-shifting or phase modulation technique which measures phases at different locations on the object's surface and computes depth information from these phases. FIG. 3 shows the phase shift with three projection patterns, collectively at 301, projected onto the object surface, and an example fringe image 302. Image reconstruction via phase shift is a well-known method wherein intensities for each pixel (x,y) of the three projected fringe patterns are described by the following relationships:

$$I_1(x,y)=I_0(x,y)+I_{mod}(x,y)\cos(\phi(x,y)-\theta), \quad (2)$$

$$I_2(x,y)=I_0(x,y)+I_{mod}(x,y)\cos(\phi(x,y)), \quad (3)$$

$$I_3(x,y)=I_0(x,y)+I_{mod}(x,y)\cos(\phi(x,y)+\theta), \quad (4)$$

Where $I_1(x,y)$, $I_2(x,y)$ and $I_3(x,y)$ are the intensities of three fringe patterns, $I_0(x,y)$ is the DC component (background), $I_{mod}(x,y)$ is the modulation signal amplitude, $\phi(x,y)$ is the phase, and $\theta$ is the constant phase-shift angle. Phase unwrapping is the process that converts the wrapped phase to an absolute phase. The phase information $\phi(x,y)$ can be retrieved (i.e., unwrapped) from the intensities in the three fringe patterns:

$$\phi' = \arctan\left[\sqrt{3}\,\frac{I_1(x,y)-I_3(x,y)}{2I_2(x,y)-I_1(x,y)-I_3(x,y)}\right] \quad (5)$$

Figure 4:
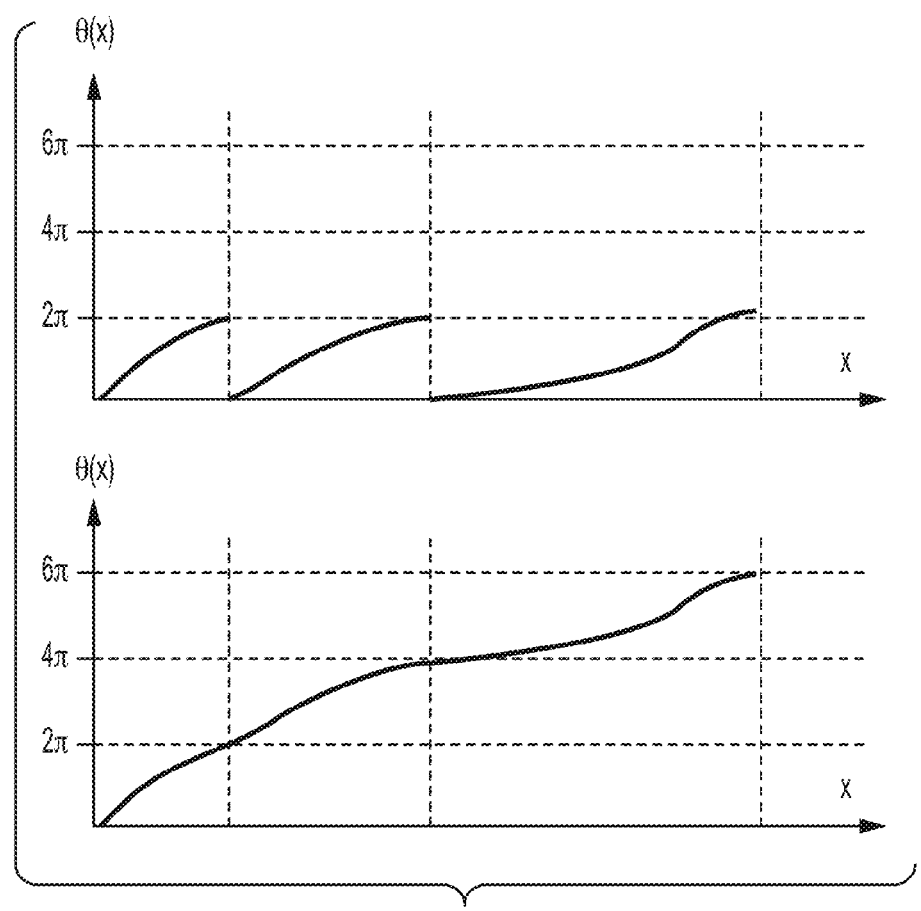
FIG. 4 illustrates one example embodiment of a phase unwrapping process.

The discontinuity of the arc tangent function at $2\pi$ can be removed by adding or subtracting multiples of $2\pi$ on the $\phi'(x,y)$ value (of FIG. 4):

$$\phi(x,y)=\phi'(x,y)+2k\pi \quad (6)$$

where k is an integer representing the projection period. Note that unwrapping methods only provide a relative unwrapping and do not solve for the absolute phase. The 3D (x,y,z) coordinates can be calculated based on the difference between measured phase $\phi(x,y)$ and the phase value from a reference plane.

Figure 5:
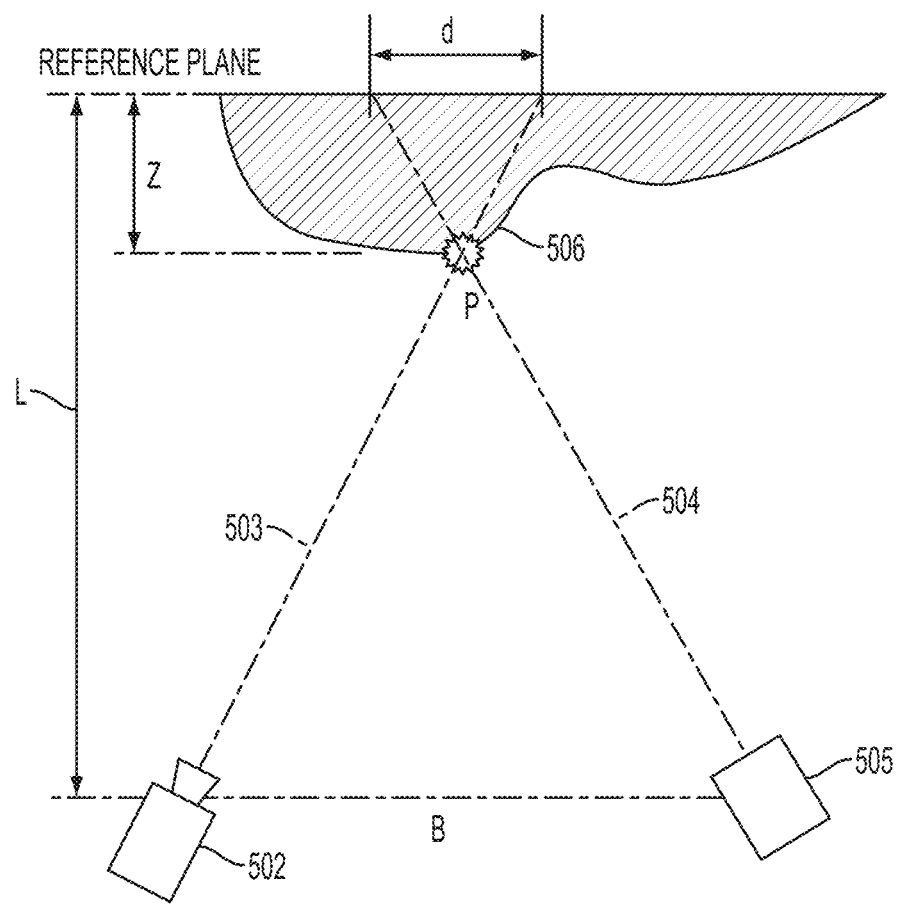
FIG. 5 shows a system which utilizes an image sensor to sense reflected light emitted by a patterned source projector in accordance with one embodiment hereof.

Reference is now being made to the system of FIG. 5 which utilizes a video camera 502 to sense light 504 projected by patterned illumination source projector 505 being reflected (at 503) off point P of 3D object 506, i.e., a location in the subject's thoracic region. Depth values are calculated by a geometry given by:

$$\frac{Z}{L-Z}=\frac{d}{B} \quad (7)$$

which reduces to:

$$Z \approx \frac{L}{B}d \quad (8)$$

where L, B, d are defined by way of illustration in FIG. 5.

Stripe indexing can also be used to achieve 3D surface reconstruction because the order in which the stripes are observed is not necessarily the same as the order in which the stripes are projected due to the inherent parallax existing in triangulation-based 3D surface imaging systems and the possibility to have stripes missing from the acquired image due to occlusion of 3D surface features. The collection of pixels forms the image. Use of color for stripe indexing in the projection patterns helps alleviate the ambiguity problem faced by phase-shift or multiple-stripe techniques using monochromatic patterns. This type of system enables encoding of multiple patterns into a single color projection image with each pattern possessing a unique color value. In order to reduce the decoding error rate, one can select a color set in which each color has a maximum distance from any other color in the set. The maximum number of colors is limited to a distance between colors that generates a minimal crosstalk in the acquired images. It should be appreciated that if the target 3D object is static and the application does not impose stringent constraints on the acquisition time, multiple-shot (sequential) techniques can be used and may often result in more reliable and accurate results. On the other hand, if the target is moving, single-shot techniques are used to acquire a snapshot 3D surface image of the 3D object at a particular time instance. Single-shot techniques can be classified into techniques using continuously varying structured-light patterns, those using 1D encoding schemes (strip indexing), and those using 2D encoding schemes (grid indexing). Each technique has its own advantages and disadvantages, depending on the specific applications. Some techniques can be combined. For further information on 3D imaging techniques, the reader is respectfully directed to the above-incorporated reference entitled: "Structured-Light 3D Surface Imaging: A Tutorial", by Jason Geng.

Example Dual Illumination Source Configuration

Figure 6:
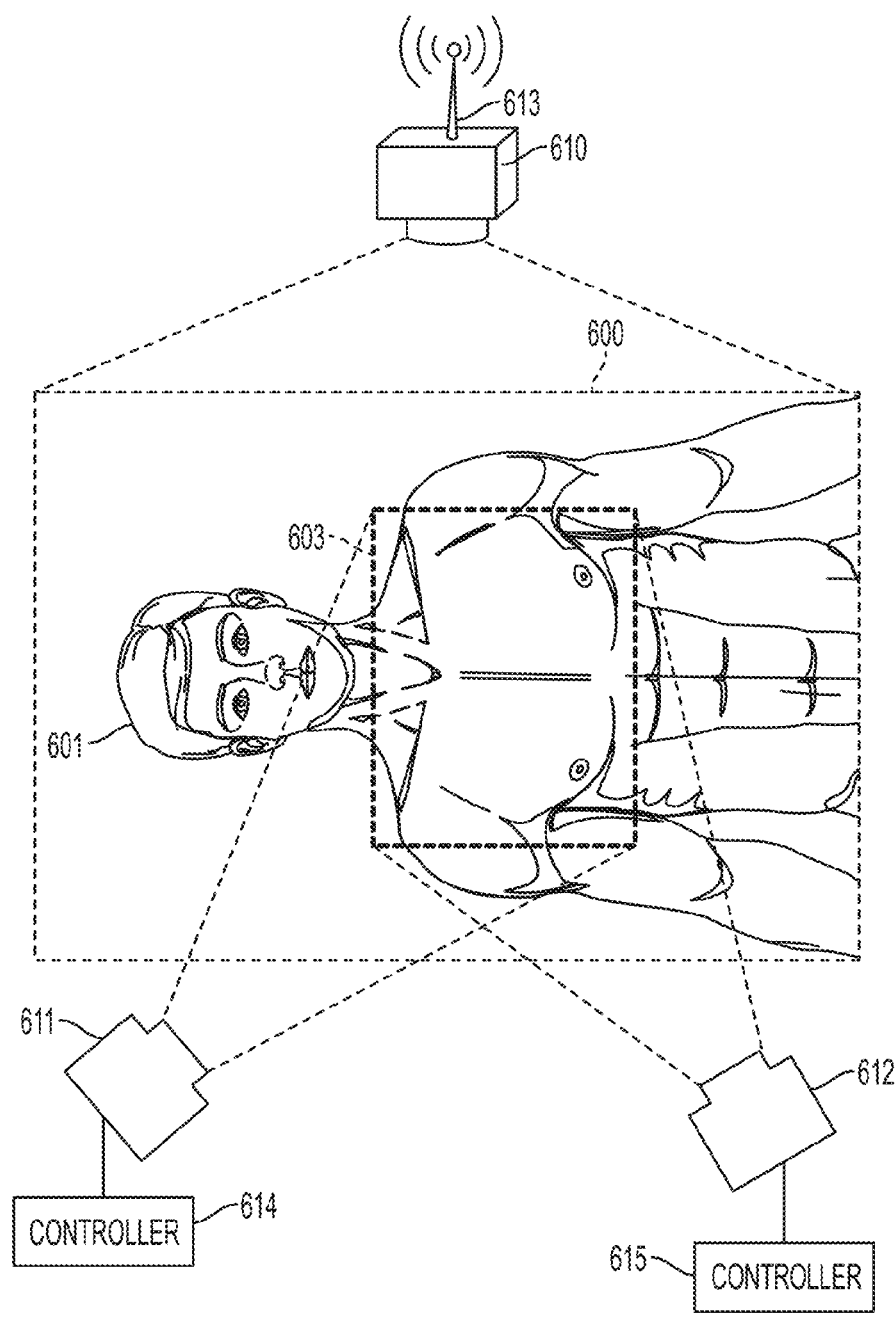
FIG. 6 illustrates an example scene illuminated with structured and unstructured light sources and a video capture device actively acquiring a video of a region of interest of a subject.

Reference is now being made to FIG. 6 which illustrates an example scene illuminated with structured and unstructured light sources and a video capture device actively acquiring a video of a subject 601 in a scene 600. A region of interest can be identified by processing the video using, for example, any of a variety of techniques including object identification, pixel classification, material analysis, texture identification, and/or pattern recognition. In one embodiment, video capture device 610, illustrated by way of example, captures reflected energy off chest area 603 emitted by structured illumination source 611 and unstructured illumination source 612. Both illumination sources can be manipulated such that their respective light sources can be spectrally and/or temporally varied in accordance with the teachings hereof. Hybrid device 610 is shown having a communication element 613 to effectuate a bi-directional communication with a remote device, such as a computer workstation or device controller. Controller 614 effectuates a manipulation of structured illumination source 611 in accordance herewith, and controller 615 effectuates a manipulation of unstructured illumination source 612 in accordance herewith. Controllers 614 and 615 are in communication via pathways not shown with various components of the special purpose computer of FIG. 8.

Flow Diagram of One Embodiment

Figure 7:
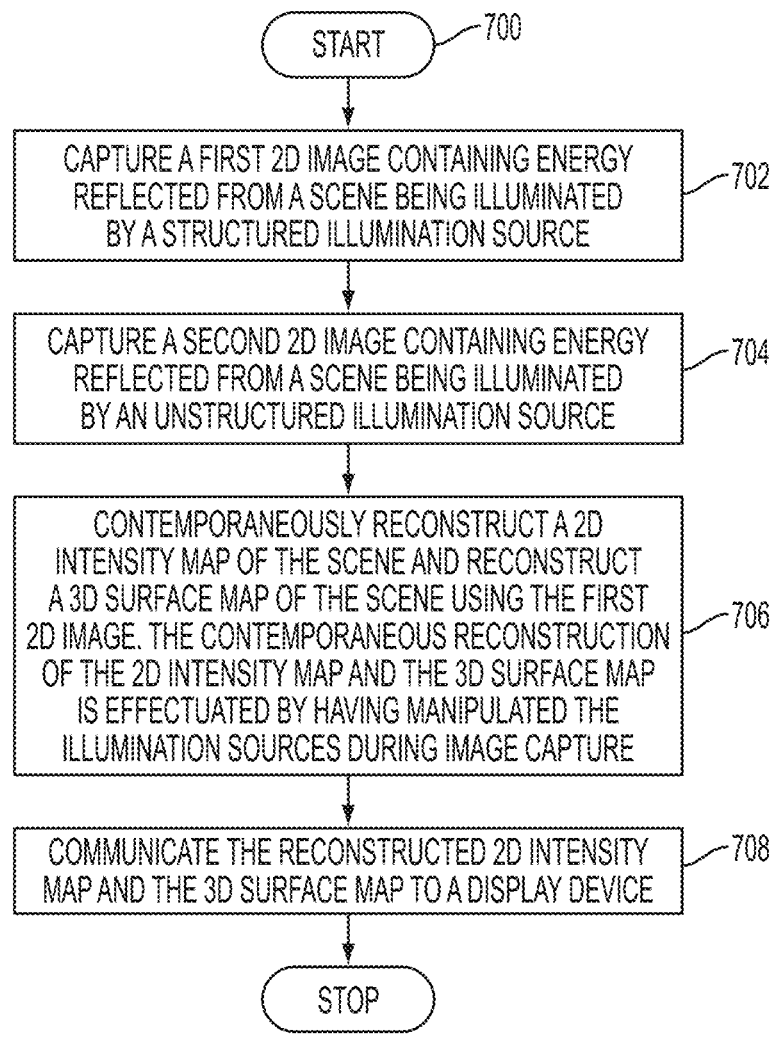
FIG. 7 is a flow diagram which illustrates one example embodiment of the present method for contemporaneously reconstructing images captured of a scene being illuminated with unstructured and structured illumination sources.

Reference is now being made to the flow diagram of FIG. 7 which illustrates one example embodiment of the present method for contemporaneously reconstructing images captured of a scene being illuminated with unstructured and structured illumination sources. Flow processing begins at step 700 and immediately proceeds to step 702.

At step 702, capture a first 2D image containing energy reflected from a scene being illuminated by a structured illumination source. In various embodiments, the structured and unstructured illumination sources have overlapping spectral content within a wavelength band of interest.

At step 704, capture a second 2D image containing energy reflected from the scene being illuminated by an unstructured illumination source. The structured and unstructured illumination sources can be visible, infrared, or a combination of visible and infrared light sources.

At step 706, contemporaneously reconstruct a 2D intensity map of the scene using the second 2D image and reconstruct a 3D surface map of the scene using the first 2D image. The contemporaneous reconstruction is effectuated by having manipulated the illumination sources during capture of the first and second 2D images. In the embodiment where the unstructured illumination source is an ambient light source, the manipulating comprises sequentially alternating a projection of the structured illumination source onto the scene during video capture. In the embodiment where the unstructured illumination source is not an ambient light source, the manipulating comprises one of: (1) sequentially alternating a projection of the structured and unstructured illumination sources such that neither of the sources is projecting light concurrently. The alternating sequence can be determined by external events and/or a pre-selected sequence. External events include any of: a state change exceeding a pre-determined threshold, and a motion exceeding a pre-determined threshold. (2) Selectively choosing a first and second region of interest in the scene, the first region being illuminated by the structured illumination source and the second region being illuminated by the unstructured illumination source, such that neither of the sources is concurrently projecting light onto a same region. The selectively choosing can be determined by the specific signals that can be extracted from each of the regions of interests. For example, the subject's face can be used to extract cardiac signals while the subject's thoracic region can be used to determine variations in chest volume. Or, (3) spectrally multiplexing the illumination sources by making the wavelength range of a first of the illumination sources narrower than a wavelength range of a second of the illumination sources such that reflected energy from both sources can be recovered via filtering.

At step 708, communicate the reconstructed 2D intensity map and the 3D surface map to a display device. Thereafter, in this embodiment, further processing stops.

Example System For Manipulating Illumination Sources

Figure 8:
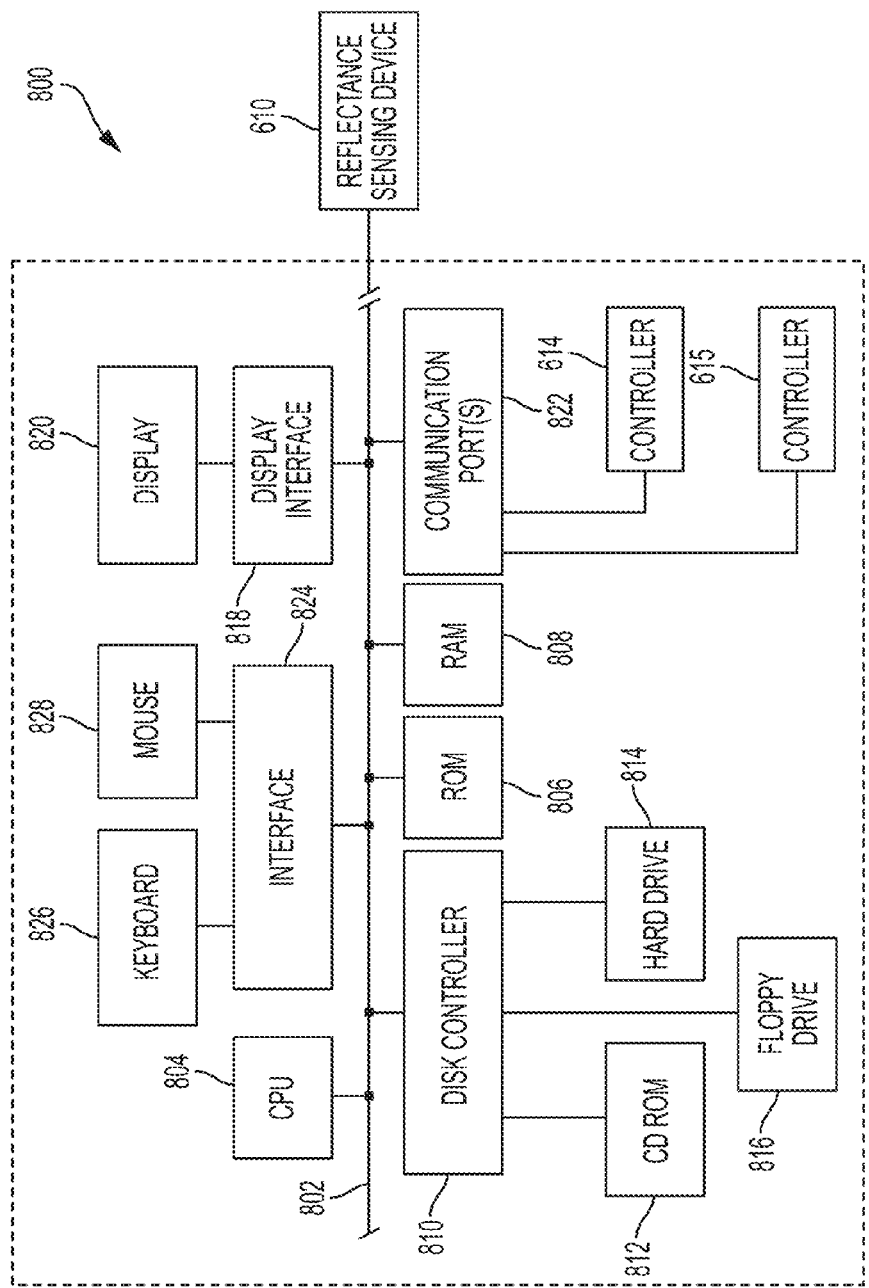
FIG. 8 illustrates a block diagram of one example special purpose computer for implementing various aspects of the present method as described with respect to the flow diagram of FIG. 7.

Reference is now being made to FIG. 8 which illustrates a block diagram of one example special purpose computer for implementing various aspects of the present method as described with respect to the flow diagram of FIG. 7. Such a special purpose processor is capable of executing machine executable program instructions for causing the controllers, 614 and 615, of FIG. 6 to manipulate the structured and unstructured illumination sources in accordance with the teachings hereof, and may comprise any of a micro-processor, micro-controller, ASIC, electronic circuit, or any combination thereof.

In FIG. 8, communications bus 802 is in communication with a central processing unit (CPU) 804 capable of executing machine readable program instructions for performing any of the calculations, comparisons, logical operations, and other program instructions for performing any of the steps described above with respect to the flow diagrams and illustrated embodiments hereof. Processor 804 is in communication with memory (ROM) 806 and memory (RAM) 808 which, collectively, constitute example storage devices. Such memory may be used to store machine readable program instructions and other program data and results to sufficient to carry out any of the functionality described herein. Disk controller 810 interfaces with one or more storage devices 814 which may comprise external memory, zip drives, flash memory, USB drives, or other devices such as CD-ROM drive 812 and floppy drive 816. Storage device stores machine executable program instructions for executing the methods hereof. Such storage devices may be used to implement a database wherein various records are stored. Display interface 818 effectuates the display of information on display 820 in various formats such as, for instance, audio, graphic, text, and the like. Interface 824 effectuates a communication via keyboard 826 and mouse 528, collectively a graphical user interface. Such a graphical user interface is useful for a user to enter information about any of the displayed information in accordance with various embodiments hereof. Communication with external devices may occur using example communication port(s) 822. Shown is communication port(s) 822 being placed in communication with the camera system 613 of FIG. 6 and each of the controllers 614 and 615 to effectuate a manipulation of the illumination sources 611 and 612. Such ports may be placed in communication with such devices over networks not shown such as, for example, the Internet or an intranet, either by wired or wireless links. Example communication ports include modems, network cards such as an Ethernet card, routers, a PCMCIA slot and card, USB ports, and the like, capable of transferring data from one device to another. Software and data is transferred via the communication ports in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

The teachings hereof can be implemented in hardware or software using any known or later developed systems, structures, devices, and/or software by those skilled in the applicable art without undue experimentation from the functional description provided herein with a general knowledge of the relevant arts. The teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodologies described herein. The article of manufacture may be included as part of a computer system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method of creating maps of a subject's skin in a scene captured by a video camera comprising:

capturing: (i) a first 2D image containing energy reflected from a subject's skin being illuminated by a structured illumination source projecting a pattern of light onto the subject's skin, said first 2D image being captured with a video camera that is sensitive to electromagnetic radiation in a wavelength of the structured illumination source; and (ii) a second 2D image containing energy reflected from the subject's skin being illuminated by an unstructured illumination source;

during capturing of the first 2D image and the second 2D image, varying the structured and unstructured illumination sources such that the structured illumination source and the unstructured illumination source are not projecting light on a same region of interest of the subject's skin at the same time during capturing of the first 2D image and capturing of the second 2D image; and reconstructing a 2D intensity map using the second 2D image having been illuminated by an unstructured illumination source and a 3D surface map using the first 2D image having been illuminated by a structured illumination source, wherein said 2D intensity map is a map of said subject's vascular pattern containing blood vessels which transport hemoglobin.

2. The method of claim 1, further including communicating the reconstructed 2D intensity map and the 3D surface map to a storage device.

3. The method of claim 1, wherein said first 2D image and second 2D image comprise the same scene of the subject's skin.

4. The method of claim 1, wherein said first 2D image includes a spatial distortion introduced by a reflection of said projected structured illumination off said subject's skin, said 3D surface map being reconstructed from a characterization of said spatial distortion.

5. The method of claim 4, wherein reconstructing said 3D surface map comprises:

comparing spatial attributes of said spatial distortion to known spatial attributes of undistorted projected patterns such that said distortion can be characterized in said image;

calculating a depth map from said characterized distortion at different locations on said surface of said target region; and estimating a 3D volume from said depth map.

6. The method of claim 1, wherein said 2D intensity map is a finite indexed 2D array with discrete locations called pixels, each pixel having a value that is proportional to a reflectivity of said scene object captured at said pixel location in a wavelength of said unstructured illumination source.

7. The method of claim 1, wherein reconstructing is one of simultaneous and sequential.

8. The method of claim 1, wherein said varying is temporal.

9. The method of claim 1, wherein said varying is spatial.

10. A method, comprising:

illuminating a region of interest in a scene with a structured illumination source and an unstructured illumination source; the structured illumination source illuminating the scene using a light source emitting light in the infrared spectrum; the unstructured illumination source illuminating the scene using a light source emitting light in the visible spectrum; the unstructured illumination source and the structured illumination source having overlapping spectral bands;

capturing a video of the illuminated scene with a video capture device; the video captured by the video capture device comprising a first set of 2D image frames and a second set of 2D image frames;

spectrally multiplexing the structured illumination source and the unstructured illumination source by narrowing a wavelength range of one of the structured illumination source and the unstructured illumination source;

filtering the recorded video to recover reflected energy from the structured illumination source and the unstructured illumination source; each image frame of the first set of 2D image frames comprising an array of pixels with pixel values corresponding to detected reflected energy projected by the structured illumination source; each image frame of the second set of 2D image frames comprising an array of pixels with intensity values corresponding to detected reflected energy projected by the unstructured illumination source;

obtaining, using pixel intensity values of the second set of 2D image frames, a 2D intensity pixel map of the region of interest in the scene; and obtaining, using pixel intensity values of the first set of 2D image frames and the 2D intensity pixel map, a 3D surface map of the region of interest in the scene wherein the 2D intensity pixel map and the 3D surface map are maps of a human's vascular pattern containing blood vessels.

11. The method of claim 10, wherein the structured illumination source projects a structured light pattern.

12. The method of claim 11, wherein the structured light pattern is a grid.

13. The method of claim 10, wherein the region of interest is exposed skin of the subject.

14. The method of claim 10, wherein the wavelength range of the structured illumination is narrower than the wavelength range of the unstructured illumination source.

15. A system to create maps of a subject's skin in a scene captured by a video camera comprising:

a storage device; and a processor in communication with said storage device, said processor executing machine readable program instructions to perform:

capturing: (i) a first 2D image containing energy reflected from a subject's skin being illuminated by a structured illumination source projecting a pattern of light onto the subject's skin, said first 2D image being captured with a video camera that is sensitive to electromagnetic radiation in a wavelength of the structured illumination source; and (ii) a second 2D image containing energy reflected from the subject's skin being illuminated by an unstructured illumination source;

during capturing of the first 2D image and the second 2D image, varying the structured and unstructured illumination sources such that the structured illumination source and the unstructured illumination source are not projecting light on a same region of interest of the subject's skin at the same time during capturing of the first 2D image and capturing of the second 2D image;

reconstructing a 2D intensity map using the second 2D image having been illuminated by an unstructured illumination source and a 3D surface map using the first 2D image having been illuminated by a structured illumination source, wherein said 2D intensity map is a map of said subject's vascular pattern containing blood vessels which transport hemoglobin; and communicating the reconstructed 2D intensity map and the 3D surface map to the storage device.

16. The system of claim 15, wherein said first 2D image includes a spatial distortion introduced by a reflection of said projected structured illumination off said subject's skin, said 3D surface map being reconstructed from a characterization of said spatial distortion.

17. The system of claim 16, wherein in reconstructing said 3D surface map the processor further performs:
    comparing spatial attributes of said spatial distortion to known spatial attributes of undistorted projected patterns such that said distortion can be characterized in said image;
    calculating a depth map from said characterized distortion at different locations on said surface of said target region; and
    estimating a 3D volume from said depth map.

18. The system of claim 15, wherein said 2D intensity map is a finite indexed 2D array with discrete locations called pixels, each pixel having a value that is proportional to a reflectivity of said scene object captured at said pixel location in a wavelength of said unstructured illumination source.

* * * * *